United States Patent [19]

Rassieur

[11] Patent Number: 5,085,280
[45] Date of Patent: Feb. 4, 1992

[54] DRILL RIG SHUT-OFF SYSTEM
[75] Inventor: Charles L. Rassieur, St. Louis, Mo.
[73] Assignee: Central Mine Equipment Company, St. Louis, Mo.
[21] Appl. No.: 379,200
[22] Filed: Jul. 13, 1989
[51] Int. Cl.$^5$ ............................................. B23Q 6/00
[52] U.S. Cl. ..................................................... 173/12
[58] Field of Search ...................... 173/2, 163, 164, 12

[56] References Cited

U.S. PATENT DOCUMENTS

| | | | |
|---|---|---|---|
| 2,638,319 | 5/1953 | Ckookston | 173/2 |
| 4,249,117 | 2/1981 | Leukhardt | 173/12 |
| 4,574,893 | 3/1986 | Young et al. | 173/163 |
| 4,825,962 | 5/1989 | GiranIt | 173/2 X |

Primary Examiner—Timothy V. Eley
Assistant Examiner—Willmong22 Fridie, Jr.
Attorney, Agent, or Firm—Polster, Lieder, Woodruff & Lucchesi

[57] ABSTRACT

In a safety shut-off system for a rotary drill rig with an internal combustion engine operatively connected by a drive train to rotate a drill spindle, the drive train including a clutch, a brake is provided in the drive train, and solenoids are provided that are actuated to cause the brake to be applied, the fuel line to the engine to be closed or the ignition circuit of the engine to be broken, and the clutch to be put into a neutral condition, each of the solenoids being connected to an electric circuit from a source of current, the brake and engine stopping solenoids being continuously biased toward brake-applying, engine fuel line closing or ignition circuit breaking position, and moved against that bias by current from the power supply. At least one wobble type shut-off switch, is positioned adjacent the drill, the switch having an exposed, elongated, outwardly projecting operating lever, the displacement of which in any direction perpendicular to the long dimension of the lever opens the circuit.

15 Claims, 2 Drawing Sheets

DRILL RIG SHUT-OFF SYSTEM

BACKGROUND OF THE INVENTION

Typical safety shut-off systems on drill rigs use a button type switch that is mounted on the control panel and on the opposite side of the drill rig. The switches are connected in series and when one is depressed, the circuit to the ignition of a gasoline engine is broken, causing the engine to stop. With a diesel engine, depressing the switch causes the fuel to be cut off to the engine. Shut-off systems using a button type switch are reliable and effective. However, if someone is caught in rotating drilling tools such as augers, he may not be able to depress the shut-off switches. Another type of shut-off mechanism is described in U.S. Pat. No. 3,515,824. With this type of system a wire is provided that goes through a metal ring. If the wire is moved sufficiently, it will ground out on the metal ring causing the engine to shut off. This type of system is usually placed on the right and left sides of the drill with respect to the rig, generally at the rear of a truck platform on which the rig is mounted, and as in the case of the button type switch, an operator that is caught in the rotating tools may not be able to actuate the shut off wire. The wireline type system also has the disadvantage of being accidentally activated by loose tools around the rig, hoisting cables, etc. This type of shut-off system requires frequent attention and maintenance. For example, if the tension in the cable is not adjusted properly, it can vibrate, hitting the metal ring and causing accidental shut off. Also the ring and bare cable are exposed and can become corroded and not conduct electricity.

With a mechanically-driven drill, the activation of the shut-off device stops the engine. Because of the inertial forces of the engine flywheel and drive train components, shut off is not immediate. The drive train can make several revolutions.

One of the objects of this invention is to provide a shut-off system that is more readily accessible and more easily actuated than button-type systems in use heretofore, and more easily actuated and at the same time less liable to accidental actuation or disablement than line type systems.

Another object is to provide such a system in which the rotation of the drill is stopped quickly and positively.

Other objects will become apparent to those skilled in the art in light of the following description and accompanying drawings.

SUMMARY OF THE INVENTION

In accordance with this invention, generally stated, in a safety shut-off system for a rotary drill rig having a support structure and a drill carried by the support structure, and an internal combustion engine operatively connected by a drive train to rotate the drill, a brake is provided in the drive train, and at least one shut-off switch, preferably a wobble type switch is provided adjacent the drill spindle. In the preferred system, each of the switches has an exposed, projecting, elongated operating lever. An electric circuit in series with the switches is connected to the engine and brake and acts when the elongated operating lever of either or any switch is displaced, to stop the engine and actuate the brake to stop rotation of the drill.

In the embodiment shown, not only is the engine stopped and the brake applied, but a clutch between the engine and the drill is thrown into neutral. Three solenoids are provided in the circuit, one either breaking the ignition circuit or closing a fuel line, depending upon whether the engine is a spark ignition or diesel type engine, one acting to drop the pressure in a hydraulic line to a spring applied brake, and one acting to move the clutch into neutral. All three are continuously biased toward engine-stopping, brake-applying and neutral-positioning condition. They are moved against a continuous bias by energization from a source of current the circuit to which is broken by the displacement of the elongated lever of either or any of the wobble switches in any direction perpendicular to the long axis of the elongated lever. Failure of power in the solenoid circuit acts automatically to stop the rotation of the drill. In addition, the construction of the wobble switch is such as to protect the contacts from the weather and contamination by dust, mud and other contaminants common in the field during drilling. In certain applications, it is desirable to energize a clutch-throwing mechanism, rather than de-energize it, the movement of an armature of a relay in response to de-energization of its solenoid by the breaking of the wobble switch circuit serving to complete a clutch disengaging circuit.

DESCRIPTION OF THE PREFERRED EMBODIMENT

Figure 1:
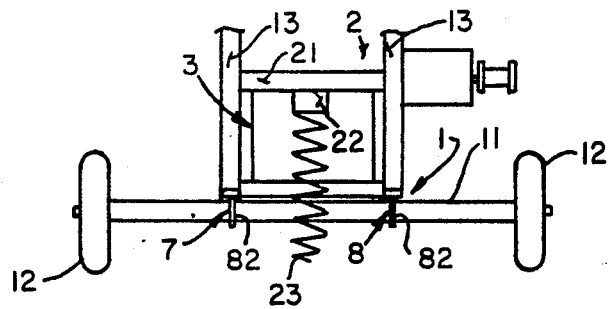
FIG. 1 is a somewhat schematic view of drill rig equipped with a shut-off system of this invention.
Figure 2:
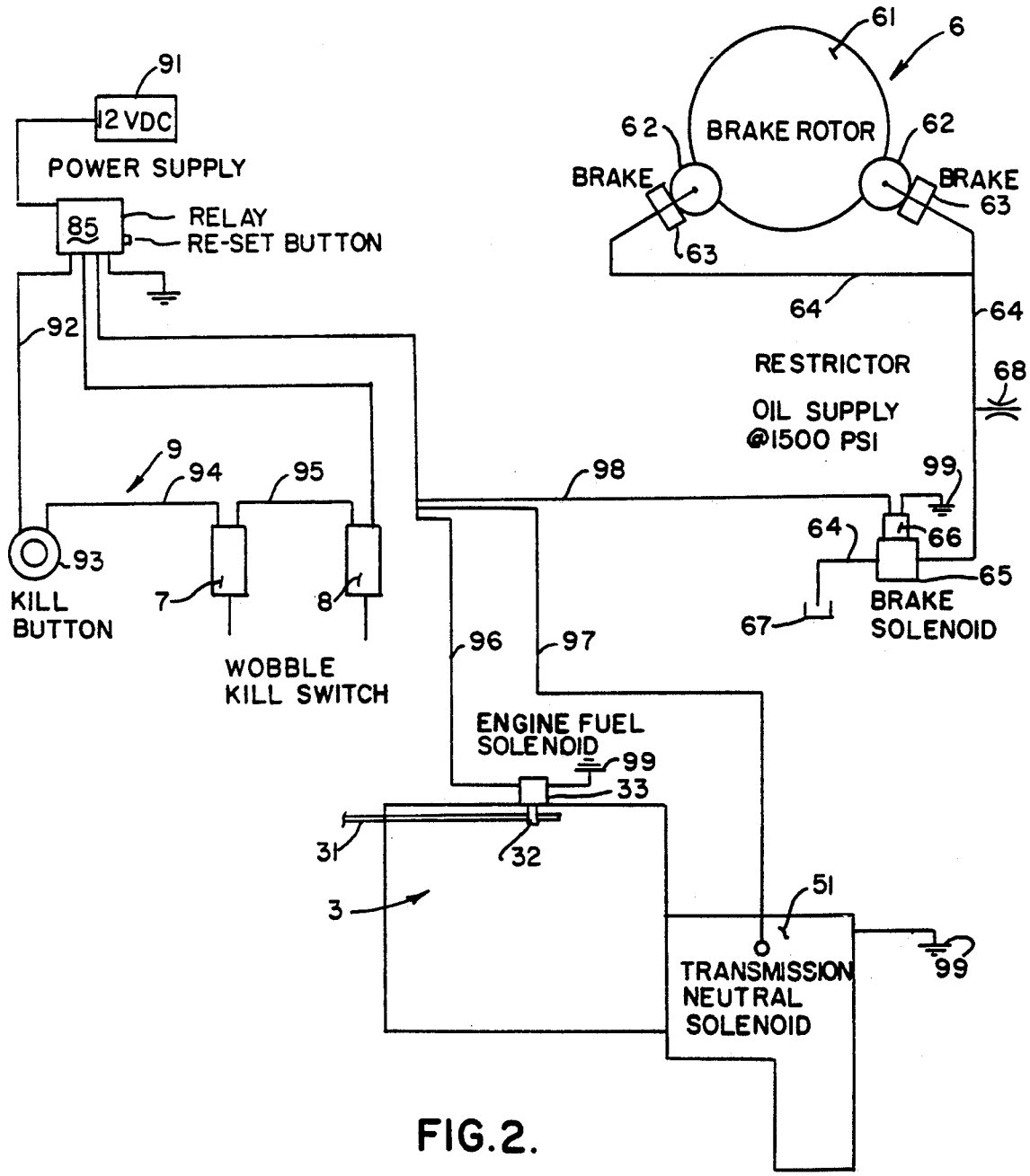
FIG. 2 is a circuit diagram with mechanical portions of the system shown schematically.
Figure 3:
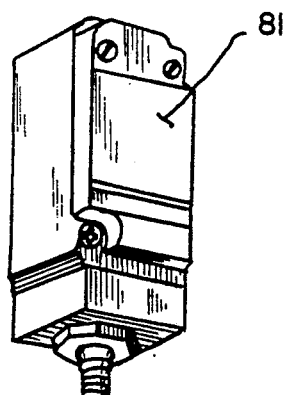
FIG. 3 is a view in perspective, partly broken, of an example of a wobble switch for use with the system of this invention.

Referring now to the drawings for an illustrative embodiment of the safety shut-off system of this invention, reference numeral 1 indicates a drill rig and support structure therefor. The rig includes a drill 2, an engine 3, a power train 4, a transmission which includes a clutch 5 shown in block form, and a brake 6. Wobble switches 7 and 8 are positioned on opposite sides of the drill 2 laterally of the support structure, i.e., with respect to a fore-and-aft direction of the support structure. The wobble switches 7 and 8 are part of an electric circuit 9.

In the embodiment shown, the support structure is carried by a truck 11 with rear wheels 12 and stanchions 13. Merely by way of illustration, the truck and stanchions can be of the type shown in applicant's U.S. Pat. No. 4,638,871, although the details of the rig and vehicle or other support form no part of this invention. In any case, a fore-and-aft direction of the support is perpendicular to the stanchions in the position shown in FIG. 1.

The drill assembly is conventional, with a rotary table 21, a chuck 22 and auger 23. Again, the drill assembly as such forms no part of this invention and can be of any conventional construction.

The engine 3 in the embodiment illustrated is a diesel engine with a fuel line 31 in which there is a shut-off valve 32 connected to be operated by a solenoid 33. In the case of a spark ignition type engine a solenoid 86 acts to break the ignition circuit positively, not simply to short it out as is explained hereinafter.

The power train 4 includes a drive shaft 42, extending from a driven side of the clutch 5, upon which the brake 6 is mounted, into a gear box or right angle drive 43, as illustrated in U.S. Pat. No. 4,638,871, for example.

A clutch solenoid 51 is arranged to cause the clutch to be thrown into neutral when the solenoid is de-energized.

The brake 6 includes a disc or rotor 61 and a conventional caliper assembly 63, with spring actuated brake pads biased toward engagement with the rotor, operating cylinders 62 to move the pads, against the bias of the springs, away from the rotor, hydraulic fluid lines 64, a dump valve 65 and a dump valve solenoid 66. A part of the hydraulic line 64 on the outlet side of the dump valve 65 communicates with a sump 67. The inlet side of the valve 65 and the brake cylinders 62 communicate with a source of oil under pressure, through a restrictor 68.

The wobble switches 7 and 8 have a switch body 81, an elongated actuating lever 82 and an orienting spring 83 that keeps the actuating lever parallel to a long axis of the switch body 81, but permits the displacement of the actuating lever in any direction in response to force or a vector of a force perpendicular to the long axis of the lever 82. The displacement of the lever 82 opens the circuit by opening contacts inside the switch box 81. When the circuit is opened, it remains open until a relay 85 is manually reset.

The electrical circuit 9 includes a power supply 91, a conductor 92 connected to one side of a kill button switch 93 the other side of which is connected in series by a conductor 94 to one side of the wobble switch 7, the other side of which is connected in series by a conductor 95 to one side of the wobble switch 8. The other side of the switch 8 is connected to the solenoid coil 86 of the relay 85, the energization of which closes the circuit to the engine fuel valve solenoid 33 through a conductor 96. The relay 85 is also connected to the clutch solenoid 51 by a conductor 97, and to the brake solenoid 66 by a conductor 98. The solenoids 33, 51 and 66 are electrically connected to a common ground 99. The de-energization of the solenoid of the relay 85 causes the relay switch to open, to break the circuit to all the solenoids.

The solenoids 33, 51 and 66 are all continuously biased toward a position at which the fuel valve is closed, the clutch put into neutral, and the brake valve 65 opened, respectively, and are moved against that bias by the current supplied by the power supply 91. Accordingly, if the power supply fails, or the kill button is depressed to open the circuit, or one of the wobble kill switches 7 and 8 is opened by the displacement of a lever 82, or even if a ground connection is broken, the rotation of the drill will stop. If either the kill button or one of the wobble switches is opened, all three of the solenoids will be de-energized, and the engine will be stopped, the clutch thrown into neutral and the brake applied.

Figure 6:
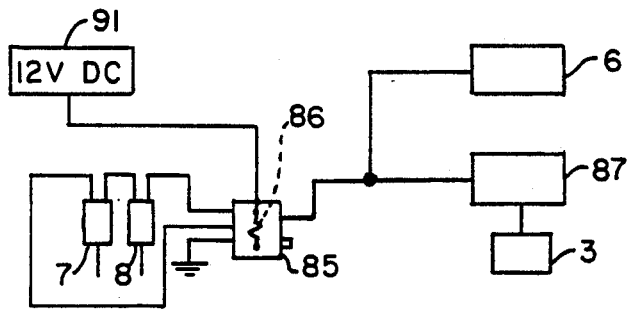
FIG. 6 is a circuit diagram of the system applied to a gasoline engine.
Figure 4:
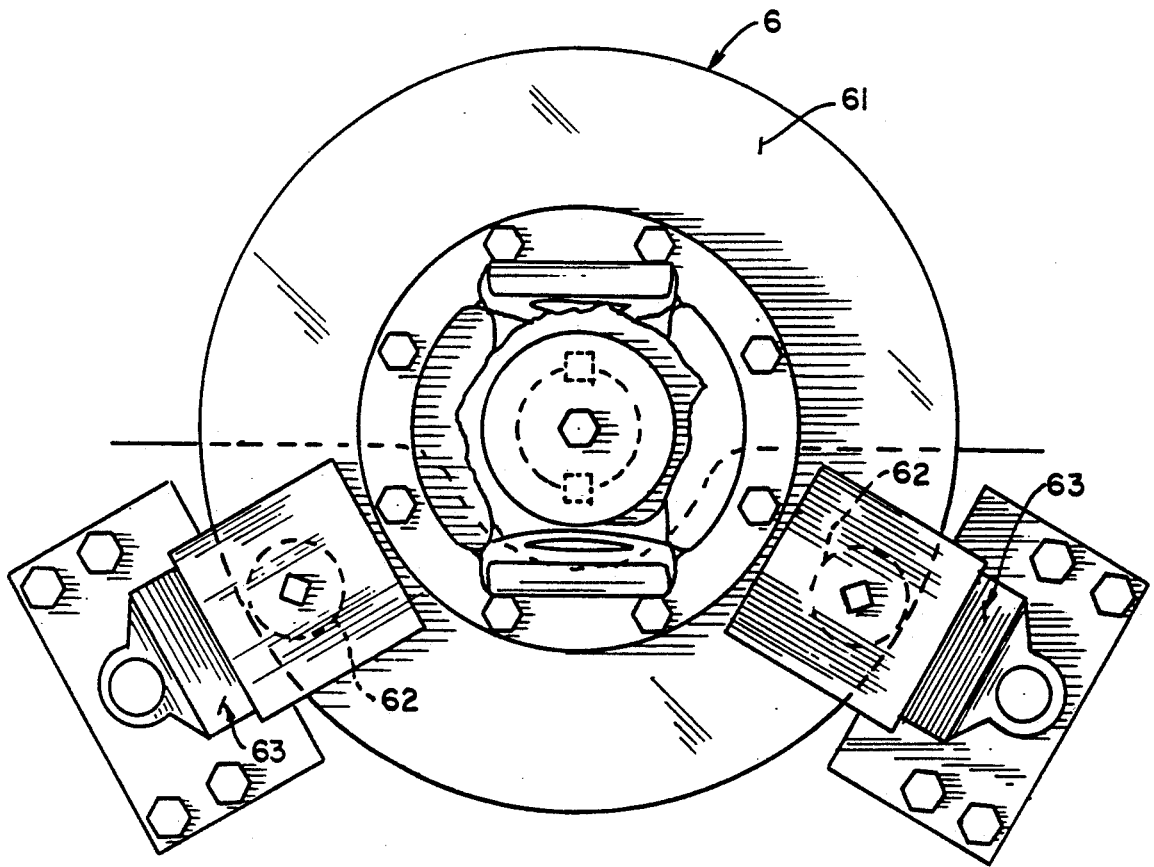
FIG. 4 is a view in side elevation, partly broken away, of a brake of the type used in the preferred embodiment of the system of this invention.

In the spark ignition type engine circuit shown in FIG. 6, the power supply 91, wobble switches 7 and 8 and brake 6 can be the same as in the first embodiment. The chief difference in the circuit is that the relay solenoid 86 when energized acts against the bias of a spring to close a normally open switch in the ignition circuit 87 of a spark ignition gasoline engine 3.

In a wobble switch of the type illustrated, the actuating lever 82 is about six inches long. The two switches are preferably located with the levers in a vertical position, depending from the bodies 81 at a height at which a worker is likely to be able to reach if his clothes should become entangled in the drill mechanism, either by touching the lever with his hand or by part of his body or his clothing. To this end, the switches are preferably located near, as for example eighteen inches to two feet on either side of the axis of rotation of the drill.

Figure 5:
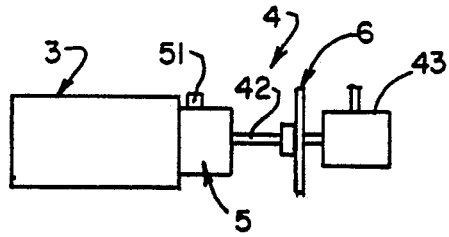
FIG. 5 is a somewhat schematic view in side elevation of an engine and power train.

Numerous variations in the construction of the device of this invention will become apparent to those skilled in the art in the light of the foregoing disclosure. Merely by way of illustration, as has been pointed out above, a solenoid actuated ignition circuit-breaking switch can be substituted for the fuel solenoid, when a spark ignition type engine is used, in which case the de-energization of the solenoid will cause the solenoid to open the ignition circuit positively. Different types of spring-biased brakes can be employed, such as band, shoe, or multiple disc types, for example. The friction members of the brake of whatever type can be electrically operated, preferably being of the type that is spring biased to braking condition and held in non-braking condition by a solenoid or the like, in which case, their operating circuits will be in series with the wobble switches. More or less than two wobble switches can be employed, positioned in different places relative to the drill, if desired. Because the provision in the drive train to a rotary drilling tool of a brake responsive to the breaking of a circuit is believed to be novel, other switches could be used in connection with the braking system, although the wobble switch is much preferred. As has been indicated, in some applications, it may be desirable to engage a circuit to disengage the clutch. In such a situation, a second contact or set of contacts can be provided to close the clutch circuit when the other circuit or circuits are opened. As is illustrated in FIG. 1, a cathead is often provided, either hydraulically driven or driven from a power takeoff from a transmission. One or more wobble switches, generally with the operating lever in a horizontal plane parallel to the axis of rotation of the cathead, can be provided adjacent the cathead, to serve the same function as the wobble switches of the preferred embodiment of the invention adjacent the drill spindle, and also to cause a shut-off if a rope on the cathead becomes tangled or rides over the inner end of the cathead. In the arrangement in which the cathead is driven from the transmission, the brake is preferably provided between the engine and the transmission, to which end a drive shaft extends between the clutch and the transmission from which both the power takeoff to the cathead and the drill spindle are driven, and the brake is positioned on that drive shaft. The breaking of the circuit by either the cathead wobble switch or the drill spindle wobble switch will actuate the brake, and may, in the described arrangement disengage the clutch without permitting the cathead to freewheel. In the arrangement shown in FIG. 5, a hydraulically operated cathead is being used. In this arrangement, one or more wobble switches can be positioned horizontally close to the cathead, in an electrical circuit that causes the hydraulic fluid by which the cathead is operated to be blocked when the lever of the wobble switch is displaced, for example. These are merely illustrative.

I claim:

1. A safety shut-off system for a rotary drill rig having a support structure and a drill spindle carried by said support structure, a drive train connected to rotate said drill spindle and an internal combustion engine operatively connected to said drive train to rotate said drill spindle, the improvement comprising a brake in said drive train and at least one physically actuable shut-off switch adjacent said drill spindle, said switch being part of an electric circuit connected to means for actuating said brake and acting, when said switch is physically actuated, to actuate said brake to stop rotation of said drill spindle.

2. The system of claim 1 in which the switch is a wobble type switch having an exposed projecting elongated operating lever, the displacement of which opens the circuit.

3. A safety shut-off system for a rotary drill rig having a support structure and a drill spindle carried by said support structure, a drive train connected to rotate said drill spindle and an engine operatively connected to said drive train to rotate said drill spindle, the improvement comprising a brake in said drive train and at least one shut-off switch adjacent said drill spindle, said switch being part of an electric circuit connected to means for actuating said brake and acting, when said switch is actuated, to actuate said brake to stop rotation of said drill, said brake having a rotating member and non-rotating friction means, said friction means being continuously biased toward engagement with said rotating member and moved out of engagement by hydraulic pressure supplied to said friction means through a hydraulic line and said electric circuit including a solenoid-operated valve in said hydraulic line, said solenoid valve acting in response to actuation of said shut-off switch to drop the said hydraulic pressure and permit said friction means to move with said continuous bias into engagement with said rotating means.

4. The improvement of claim 3 wherein said brake rotating means is a disc, said friction means comprises calipers and brake pads, and said solenoid-operated valve acts to dump hydraulic fluid by opening in response to the actuation of said switch.

5. The improvement of claim 3 wherein actuation of said switch breaks an electrical circuit, and said solenoid operated valve is continuously biased toward pressure dropping condition and is moved against said bias by current through said circuit.

6. In a safety shut-off system for a rotary drill rig having a support structure and a drill spindle carried by said support structure, a drive train connected to rotate said drill spindle and an internal combustion engine operatively connected to said drive train to rotate said drill spindle, the improvement comprising a brake in said drive train and at least one physically actuable shut-off switch adjacent said drill spindle, and an electric circuit in series with said switch, connected to means for stopping said engine and to means for actuating said brake and acting, when said switch is physically actuated, to stop said engine and actuate said brake to stop rotation of said drill spindle.

7. The improvement of claim 6 wherein the switch is a wobble type switch having an exposed projecting elongated operating lever, the displacement of which opens the circuit.

8. In a safety shut-off system for a rotary drill rig having a support structure and a drill spindle carried by said support structure, a drive train connected to rotate said drill spindle and an engine operatively connected to said drive train to rotate said drill spindle, the improvement comprising a brake in said drive train and at least one shut-off switch adjacent said drill spindle, and an electric circuit in series with said switch, connected to means for stopping said engine and to means for actuating said brake and acting, when said switch is actuated, to stop said engine and actuate said brake to stop rotation of said drill, said engine being an internal combustion engine, with a fuel line, an electric solenoid operating a fuel shut-off valve in said fuel line for shutting off the flow of fuel in said fuel line, said fuel valve solenoid being electrically connected in said safety switch circuit for shutting off the flow of fuel in said fuel line when said switch is actuated.

9. The improvement of claim 8 wherein actuation of said switch breaks said electrical circuit and said fuel valve solenoid is continuously biased toward fuel valve closing condition and is moved against said bias by current through said circuit.

10. A safety shut-off system for a rotary drill rig having a support structure and a drill spindle carried by said support structure, a drive train connected to rotate said rill spindle and an engine operatively connected to said drive train to rotate said drill spindle, the improvement comprising a brake in said drive train and at last one shut-off switch adjacent said drill spindle, said switch being part of an electric circuit connected to means for actuating said brake and acting, when said switch is actuated, to actuate said brake to stop rotation of said drill, said drive train including a clutch and a clutch solenoid adapted to cause the said clutch to be put into neutral condition when the solenoid is de-energized, said clutch solenoid being electrically connected in said safety switch circuit for putting said clutch into said neutral condition when said switch is actuated.

11. The improvement of claim 10 wherein actuation of said switch breaks said electrical circuit and said clutch solenoid operating means is continuously biased toward putting the clutch into neutral condition and is moved against said bias by current through said circuit.

12. A safety shut-off system for a rotary drill rig having a support structure and drill spindle carried by said support structure, a drive train connected to said drill spindle to rotate said drill spindle, an engine operatively connected to said drive train to rotate said drill spindle, and a clutch in said drive train, the improvement comprising a brake in said drive train, at least one shut-off switch on the side of said drill spindle with said switch having an exposed projecting operating lever and an electric circuit connected to said clutch and said brake and acting when the said operating lever of any switch is displaced, to throw said clutch into neutral and to actuate said brake to stop rotation of said drill.

13. A safety shut-off system for a rotary drill rig having a support structure and a drill carried by said support structure, a drive train connected to said drill, an engine operatively connected to said drive train to rotate said drill, and a clutch in said drive train between said engine and said drill, the improvement comprising a brake in said drive train and at least one wobble type shut-off switch on each side of said drill with respect to a fore-and-aft dimension of said support structure, each of said switches having an exposed projecting operating lever, and an electric circuit in series with said switches, an engine cut-off solenoid connected to stop said engine and continuously biased toward a position in which it does so, a clutch solenoid connected to cause said clutch to be thrown into neutral, and continuously biased in a direction in which it does so, and a brake solenoid connected to cause said brake to be applied and continuously biased toward a position in which it does so, said solenoids being moved against said continuous bias by energization of said electric circuit whereby, when the said operating lever of either or any switch is displaced to break the said circuit, the de-energization of the solenoids stops said engine, throws said clutch into neutral, and applies the brake.

14. In a machine in which an exposed rotating member is driven by an internal combustion engine, the improvement comprising at least one wobble switch adjacent said exposed member, said switch being part of an electric circuit connected to means for stopping the rotation of said member, said wobble switch having an outwardly extending operating layer oriented substantially parallel to the axis of rotation of the rotating member.

15. A safety shut-off system for a rotary drill rig having a support structure and drill spindle carried by said support structure, a drive train connected to said drill spindle to rotate said drill spindle, an engine operatively connected to said drive train to rotate said drill spindle, and a clutch in said drive train, the improvement comprising a brake in said drive train, at least one switch on the side of said drill spindle with said switch having an exposed physically actuable member and an electric circuit connected to said switch and to said clutch and said brake and acting when the said switch member of any switch is physically actuated, to throw said clutch into neutral and to actuate said brake to stop rotation of said drill spindle.

* * * * *

UNITED STATES PATENT AND TRADEMARK OFFICE
CERTIFICATE OF CORRECTION

PATENT NO. : 5,085,280
DATED : Feb. 4, 1992
INVENTOR(S) : Charles L. Rassieur It is certified that error appears in the above-identified patent and that said Letters Patent is hereby corrected as shown below:

```
Claim 14, line 7 (column 8, line 1) cancel "layer"
    and insert -- lever --.
```

Signed and Sealed this

Twenty-fifth Day of May, 1993

*Attest:*

MICHAEL K. KIRK

*Attesting Officer*        *Acting Commissioner of Patents and Trademarks*